United States Patent [19]
Barber

[11] 4,087,877
[45] May 9, 1978

[54] DRUM TOWEL DRIER FOR VEHICLES

[75] Inventor: Ivan J. Barber, Clarkson, Canada

[73] Assignee: The Allen Group Inc., Melville, N.Y.

[21] Appl. No.: 781,321

[22] Filed: Mar. 25, 1977

[30] Foreign Application Priority Data

Dec. 29, 1976 Canada .................................. 268803

[51] Int. Cl.² .............................................. B60S 3/06
[52] U.S. Cl. ................................ 15/97 B; 15/DIG. 2
[58] Field of Search ................ 15/DIG. 2, 97 B, 230, 15/230.14, 230.16, 230.19

[56] References Cited
U.S. PATENT DOCUMENTS

| 3,504,394 | 4/1970 | Weigele et al. | 15/97 B |
| 3,940,821 | 3/1976 | Moran | 15/97 B |

Primary Examiner—Edward L. Roberts
Attorney, Agent, or Firm—Don B. Finkelstein

[57] ABSTRACT

A drum towel drier for vehicles, in which towel holders are pivotally mounted around the periphery of a rotating drum. Each towel holder carries a towel and also has a lever projecting therefrom. When the towel holder enters a vehicle drying sector, the lever contacts a fixed trip pin, causing the towel holder to rotate through an arc (in the same direction of rotation as that of the drum), pulling such towel holder's towel part way off the drum. This expedites unwrapping of the towels from the drum so that they can dry a vehicle. A guide rail below the drum limits the rotation of the towel holders so that the rear towel hangs lower than the towels forwardly thereof, to improve the distribution of towels on the vehicle.

15 Claims, 4 Drawing Figures

DRUM TOWEL DRIER FOR VEHICLES

BACKGROUND OF THE INVENTION

1. Field of the Invention

This invention relates to a drum towel drier for vehicles.

2. Description of the Prior Art

In automatic vehicle washing systems, after a vehicle has been washed, it must be dried. Various types of drying systems have been used, including blowers, but towel driers have long been desirable because they are economical in their use of energy and they are relatively quiet. However, existing towel driers have several disadvantages. The major disadvantage is their bulk. The more successful existing towel driers typically employ two parallel chains from which the towels are suspended. The chains carry the towels over the vehicle to dry the vehicle, then upwardly where the towels are dried, and then carry the towels back to their starting point. The chain system is typically some 20 feet long, because a substantial distance is needed for each towel to fall off the chains into a downwardly hanging position in which it can be used to dry a vehicle. Typical examples of such chain type towel driers are shown, for example, in U.S. Pat. No. 3,504,394. Other types of towel driers, often termed "friction driers" or "curtain driers" are illustrated, for example, in U.S. Pat. Nos. 3,499,180, 3,510,898, 3,517,405, 3,683,441, 3,705,435, 3,711,883, 3,765,043, 3,825,969, and 3,859,686. None of these devices have been able to eliminate the problems inherent in their bulk and/or drying characteristics.

Drum type towel driers, which are less bulky, have been tested, but in such driers the towels tend to cling to the drum and will not readily fall into the hanging position required for drying the vehicle. One drum type washing appartus is illustrated, for example, in U.S. Pat. No. 3,862,460 but such structure is not readily adapted to providing an efficient drying apparatus.

SUMMARY OF THE INVENTION

Accordingly, it is an object of the present invention to provide a drum towel drier for vehicles in which means are provided to pull the towels positively along the periphery of the drum at a desired location, to facilitate unwrapping of the towels. In a preferred specific embodiment of the invention, each towel is suspended from a towel holder pivotally connected to the drum. Each towel holder includes a projecting lever which, when the towel holder reaches a position in which the towel is to hang down, engages a trip connected to the frame of the apparatus. The trip causes the towel holder to rotate in the same direction as that in which the drum rotates, helping to pull the towel off the drum so that it will hang down.

A second disadvantage of existing drum type towel driers has been that the towel at the bottom of the drum hangs lower than the towels on either side of the bottom. Therefore, each towel dries most efficiently only when it is carried to the lowermost position of the drum; the towels perform less efficiently in other positions.

To reduce this difficulty, the invention in another of its aspects provides a guide rail which limits the pivoting of the towel holders. Preferably the guide rail slopes downwardly along the direction of travel of the vehicle, so that the rear towel (which is spaced rearwardly of the bottom of the drum) hangs lower than the towels which are located forwardly thereof.

Either of the above features may be used separately, but preferably they are used in combination.

BRIEF DESCRIPTION OF THE DRAWINGS

Further objects and advantages of the invention will appear from the following description, taken together with the accompanying drawings, in which:

FIG. 4 is a diagrammatic side view showing another embodiment of the invention.

DESCRIPTION OF THE PREFERRED EMBODIMENTS

Figure 1:
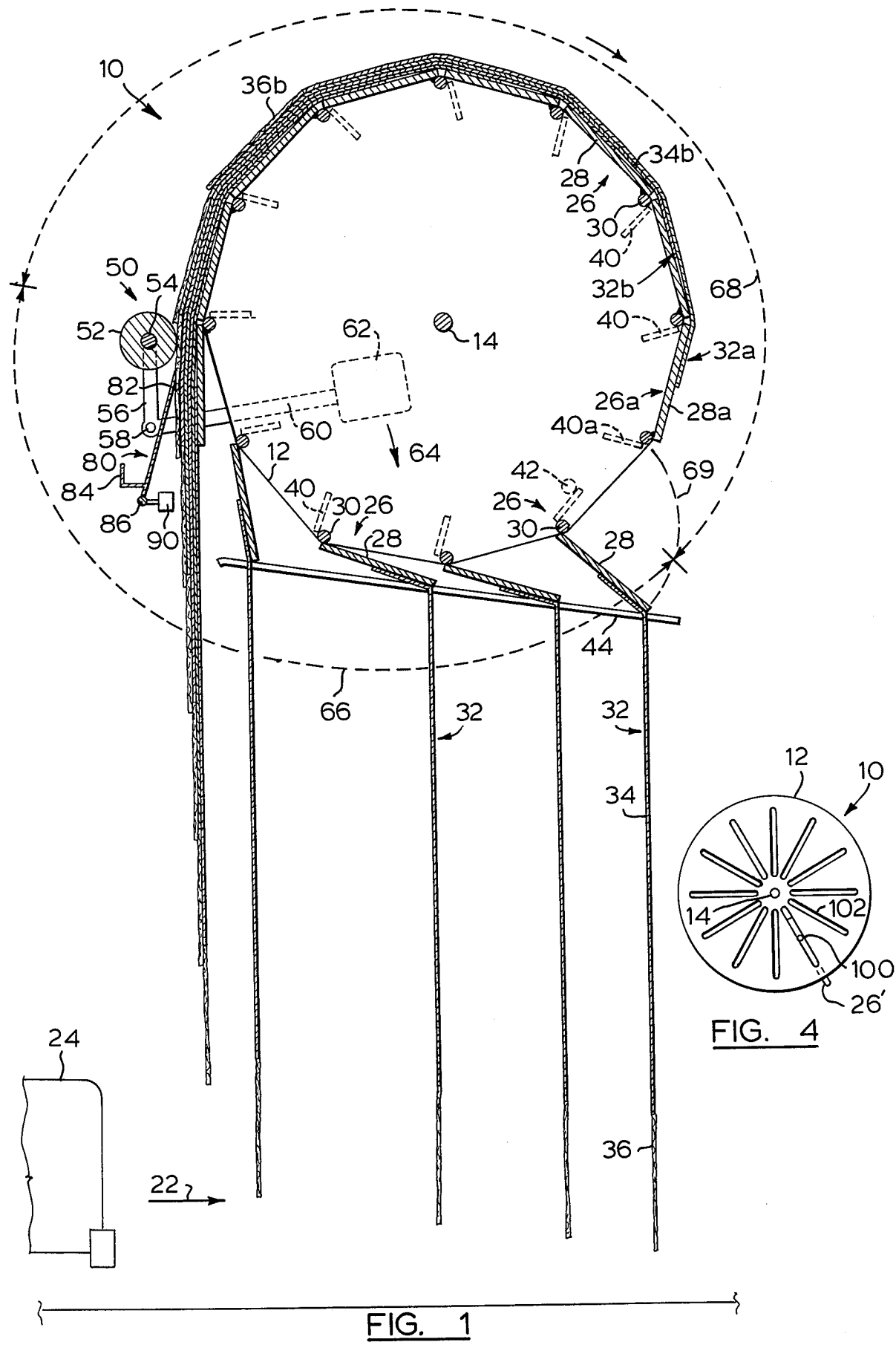
FIG. 1 is a side view illustrating a drum towel drier according to the invention, with one flange of the drum omitted.

As shown in the drawings, the towel drier includes a drum 10 having a pair of laterally spaced flanges 12 mounted on an axle 14. The axle 14 is journalled at 16 in the frame 18 of the system and is rotated by any suitable means, such as a hydraulic motor diagrammatically indicated at 20. The frame 18 supports the drum 10 over the path of advance 22 of a vehicle 24 to be washed. The drum 10 is sufficiently wide (typically 7 feet or more) that it spans the entire width of the vehicle to be dried.

Spaced circumferentially around the periphery of the drum 10 are towel holders 26. Each towel holder 26 includes a flat plate 28 welded to an axle 30. Each axle 30 is journalled in bushings 31 in the flanges 12 for free rotation about its own axis. The axles 30 together define a circle with the central axle 14 at its centre.

Each flat plate 28 is of width nearly equal to the distance between the flanges 12, and is of length sufficient to bridge the gap between adjacent axles 30. Thus, when a towel holder 26 is pivoted in a counter clockwise direction, its flat plate 28 moves against and is stopped by the axle 30 of the next towel holder, as shown in FIG. 1.

Attached to the outer surface of each flat plate 28, by any suitable means, is a towel 32. Each towel 32 is of substantial length, typically 6 feet, so that it can reach down to contact the vehicle 24 to be dried. Each towel 32 is of width slightly less than that of its flat plate 28 and has a side edge 33 inset from that of its flat plate 28 for a reason to be described.

Normally each towel 32 consists of an upper support portion 34, made of canvas, plastic or other relatively low friction material, and a lower drying portion 36 made of chamois or other suitable water absorbent material.

In a typical embodiment of the invention, utilizing a 4 foot diameter drum 10 with 12 towel holders 26, each support portion 34 is about 4½ feet long and each drying portion 36 is about 1½ feet long.

Figure 2:
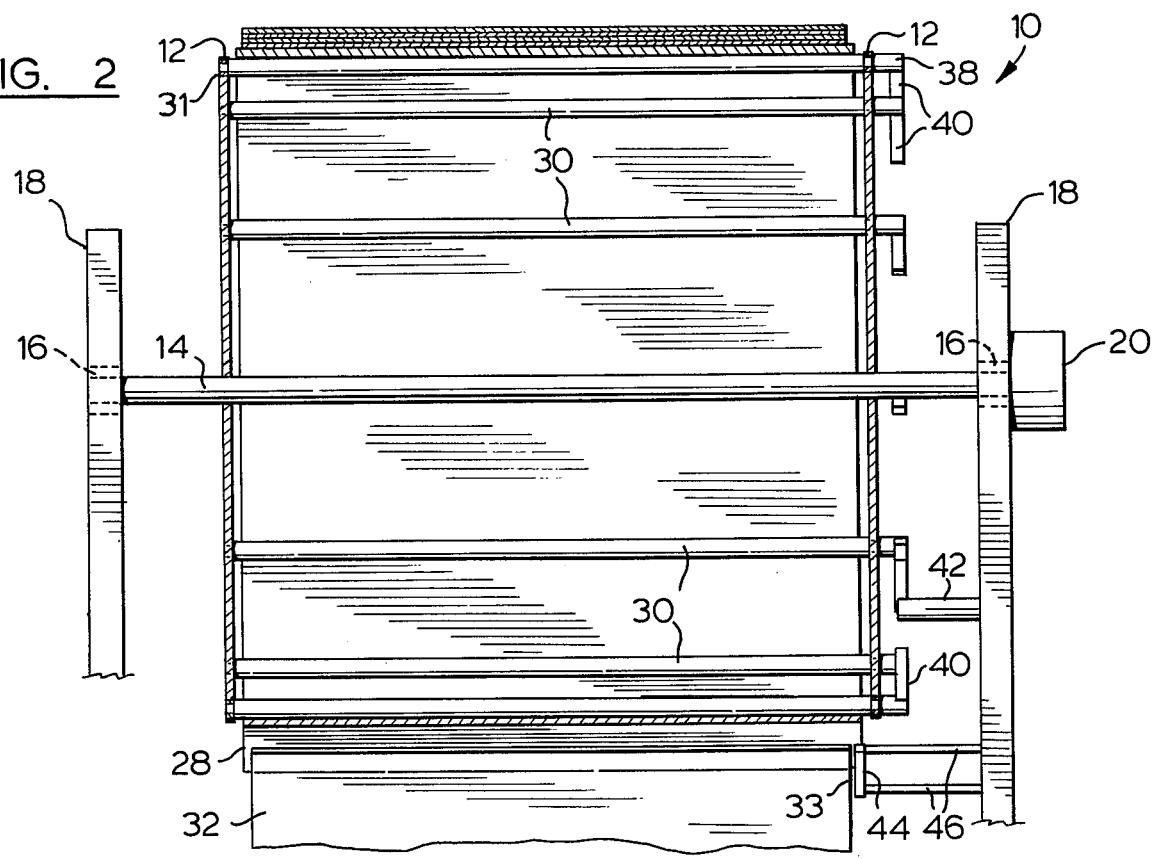
FIG. 2 is a rear view of the towel drier of FIG. 1 with parts of the towel holders and towels omitted for clarity.

As shown in FIG. 2, the axle 30 of each towel holder 26 projects outwardly past one of the flanges 12. The outward projection is indicated at 38. Welded to each outward projection 38 is a lever 40 which is also shown in FIG. 1. Each lever 40 typically extends at right angles to its associated flat plate 28. A fixed trip pin 42 extends inwardly from the frame 18 in a position to be engaged by each lever 40 as the drum rotates, as will be explained.

Located beneath the drum 10 is a guide rail 44. The guide rail 44 is secured to the frame 18 by struts 46 and is located laterally between the edges 33 of the towels 32 and the edges of the flat plates 28.

Figure 3:
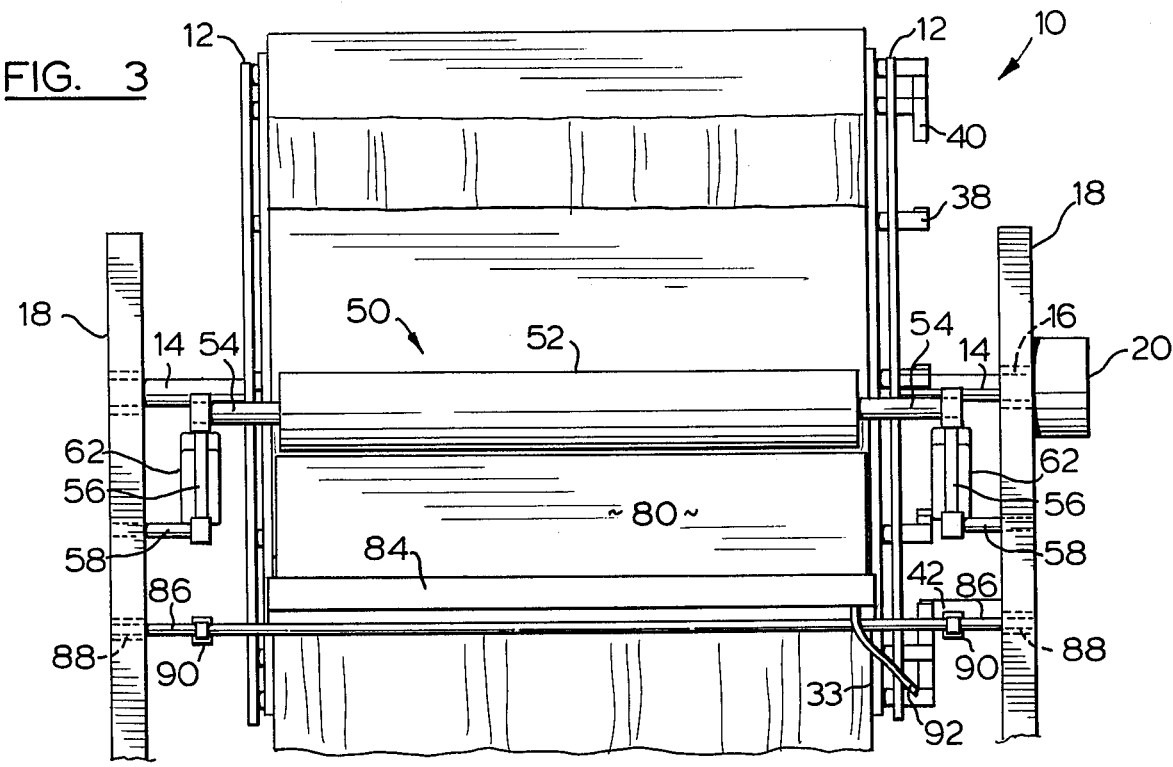
FIG. 3 is a front view showing the towel drier of FIG. 1, also with parts of the towels and towel holders omitted for clarity.

As best shown in FIGS. 1 and 3, a wringer 50 is provided to squeeze access water from the towels 32 after the towels have absorbed water from the vehicle being dried. The wringer 50 includes a large roller 52 rotatably mounted on a central axle 54. The axle 54 is fixedly mounted at the free ends of a pair of laterally spaced L-spaced arms 56. The arms 56 are pivotally mounted at their apex on axles 58 which are secured to the frame 18. The other ends 60 of the arms 56 extend upwardly and rearwardly and carry heavy counterweights 62 at their ends. The counterweights 62 bias the roller 52 bodily clockwise as indicated by arrow 64.

The operation of the system as so far described is as follows. The path through which the drum 10 locates may be divided into two sectors, namely a vehicle drying sector 66, and a return sector 68. As shown in FIG. 1, as the towel holders 26 pass through the vehicle drying sector 26, they assume a position in which the flat plates 28 project at least partly radially outwardly of the drum 10. The reason for this will be described shortly. Then, as each towel holder 26 passes through the return sector 68, its towel 32 begins to wrap around the drum 10, due to gravity. This pivots each towel holder 26 counterclockwise, until the free end of its flat plate 28 rests against and is stopped by the axle 30 of the adjacent towel holder.

When a towel holder 26 leaves the return sector 68 and enters the vehicle drying sector 66, the operation is as follows. Consider the towel holder 26a in FIG. 1. The towel 32a of this towel holder is wrapped nearly half way around the periphery of the drum 10 (assuming a 4 foot diameter drum and a 6 foot long towel) and would not normally fall down into vehicle drying position until the towel holder 26a had rotated most of the way through the vehicle drying sector 66.

According to the invention, and as shown in FIG. 4, when the lever 40a of towel holder 26a is carried into contact with trip pin 42, the towel holder 26a is caused to rotate clockwise in the direction of rotation of the drum 10. As shown, the extent of the rotation is typically more than 80° and may be nearly 90° or more.

Since each flat plate 28 will typically be slightly more than 1 foot in length (assuming 12 towel holders on a 4 foot diameter drum) the free end of the flat plate 28 will typically rotate through an arc 69 of about 18 inches or more in length. This will pull the towel 32a partly off the drum 10. The portion of the towel 32a suspended in the air will be between about 2 and 3 feet in length. Since the remainder of the towel 32a rests on the support portion 34b of the next towel 32b, and since the support portion 34b is relatively smooth and slippery (as contrasted with the drying portion 36b of the towel), the weight of the suspended portion of the towel 32a is sufficient to drag the entire towel 32a off the drum and to cause it to fall into the hanging position shown in FIG. 1.

If necessary, the diameter of the drum 10 can be increased so that the length of the flat plates 28 can be correspondingly increased, to increase the distance through which the towels are pulled. However, it is preferred to keep the drum diameter no larger than about 4 feet, to reduce the height requirements of the car wash in which it is installed. However, the angle through which each towel holder 26 is rotated can be controlled by the position of the trip pin 42 and also by the angle between the lever 40 and the flat plate 28 of each towel holder. If this angle is increased beyond 90°, then the angle through which each towel holder is rotated can also be made greater than 90°, increasing the length of the arc through which the free end of each flat plate 28 travels. For example, if the angle between the flat plate 28 and the lever 40 of a towel holder is 110°, then the arc through which each towel holder rotates may typically be about 100° or more, which would pull a towel down about 22 inches for the 4 foot diameter drum mentioned.

It will be appreciated that in the example given, in which the length of the flat plates 28 is about 1 foot and the length of the drying portion 36 of each towel is about 18 inches, the drying portion of one towel will overlap the drying portion of the next towel (when both are wrapped around the drum 10) only by about 6 inches. The distance by which each towel 32 is pulled by its towel holder is preferably substantially greater than this, so that in all cases, the drying portion of the towel being pulled will rest, after it has been pulled by its towel holder, only on the relatively smooth support portion 34 of the next towel. This facilitates unwrapping of the towels.

As best shown in FIG. 1, the extent to which the towel holders 26 can pivot is limited by the guide rail 44. The guide rail 44 slopes downwardly from front to rear, so that the rear towel 32 hangs lowest, and the towels forwardly of the rear towel hang at progressively higher positions. This permits the water load on the towels to be more evenly distributed and produces improved drying of the vehicle. In effect it improves the distribution of towels on the vehicle.

After the towels have dried the vehicle 24, they are carried upwardly past the roller 52. The towels are here squeezed between the roller 52 and the flat plates 28, forcing excess water from the towels.

To prevent the excess water from running back onto the following towels or onto the vehicle being dried, a wiper 80 is provided. As shown in FIGS. 1 and 3, the wiper 80 includes a wiper sheet 82 having a trough 84 formed at its lower end. Both the wiper sheet 82 and the trough 84 extend the width of the roller 52. The wiper 80 is secured at its lower end to an axle 86 pivotally mounted at 88 to the frame 18. Connected to the axle 86 are counterweights 90 which bias the free end of the wiper sheet 82 against the towels. A tube 92 connected to one or both ends of the trough 84 leads the water removed from the towels to a suitable drain, not shown.

After the towels pass through the wringer 50, they are carried through the return sector 68 and back to the vehicle drying sector 66.

If desired, other means may be employed to pull the towels part way off the drum when the towel holders enter or approach the vehicle drying sector 66. For example, and as indicated in FIG. 4, where primed reference numerals indicate parts corresponding to those of FIGS. 1 to 4, each towel holder 26' may be a radially oriented member mounted for radially reciprocating movement and guided by pins 100 in slots 102 in the flanges 12'. An actuating device, not shown, may be used to drive each towel holder 26' radially outwardly as it enters the vehicle drying sector 66, and appropriate means (e.g. a spring) may be used to return the towel holders immediately thereafter to their withdrawn position. Alternatively, the towel holders may be drawn radially inwardly, pulling their towels over an appropriate fixed bar, not shown, to pull the towels along the circumference of the drum. However, the rotary motion shown for the towel holders in the FIGS. 1 to 4 embodiment is much preferred because of its greater simplicity, lower cost, and more inherently trouble-free performance.

I claim:

1. A drum towel drier for drying vehicles, comprising in combination:
   (a) a drum having a central axis,
   (b) a frame,
   (c) means mounting said drum on said frame with said axis horizontal, for rotation of said drum about said axis and with a space therebelow for a vehicle to be dried to pass below said drum, along a path of travel,
   (d) a plurality of towel holders spaced around the periphery of said drum, each towel holder having an end portion, and a towel connected to said end portion of each towel holder,
   (e) drive means for rotating said drum in a predetermined direction about said axis, for carrying each towel holder through a vehicle drying sector located at the bottom of said drum and a return sector,
   (f) means mounting each towel holder for movement of said end portion thereof between a first position and a second position, said second position being displaced from said first position such that a towel attached to a said end portion and extending around said drum in a direction opposite to said predetermined direction is pulled around said drum in said predetermined direction when said end portion is moved from said first to said second position,
   (g) means for moving said end portion of each towel holder to said first position as such towel holder is carried through said return sector,
   (h) cooperating trip means on said frame and on each towel holder for moving each end portion from said first to said second position as the towel holder thereof is carried from said return sector into said vehicle drying sector, whereby to facilitate unwrapping of said towels from said drum,
   (i) and drying means located in said return sector for removing water from said towels.

2. A drier according to claim 1 wherein said means (f) includes means pivotally mounting each towel holder, said second position being one in which said end portion of each towel holder is rotated angularly through an arc from said first position in the direction of rotation of said drum.

3. A drier according to claim 2 and further comprising:
   a guide rail located below said drum and extending along said path of travel of said vehicle to limit the extent of rotation of said towel holders.

4. A drier according to claim 2 and further comprising:
   a guide rail located below said drum and extending along said path of travel of said vehicle to limit the extent of rotation of said towel holders, said guide rail sloping downwardly in the direction of travel of said vehicle so that the rearmost towel hangs downwardly to an extent greater than towels forwardly thereof.

5. A drier according to claim 2 wherein said means (h) includes lever means connected to each towel holder and a trip member fixed to said frame for contacting a said lever means to rotate said end portion of the towel holder thereof through said arc.

6. A drier according to claim 5 and further comprising:
   a guide rail located below said drum and extending along said path of travel of said vehicle to limit the extent of rotation of said towel holders.

7. A drier according to claim 5 and further comprising:
   a guide rail located below said drum and extending along said path of travel of said vehicle to limit the extent of rotation of said towel holders, said guide rail sloping downwardly in the direction of travel of said vehicle so that the rearmost towel hangs downwardly to thereof. extent greater than towels forwardly thereof 8. A drier according to claim 5 wherein each towel includes a drying portion and a support portion, said drying portion being of predetermined length and said support portion being of smooth material, said drying portion of each towel overlapping the drying portion of the next towel by a predetermined distance when both such towels are wrapped around said drum, the length of said arc being greater than said predetermined distance.

9. A drier according to claim 8 and further comprising:
   a guide rail located below said drum and extending along said path of travel of said vehicle to limit the extent of rotation of said towel holders.

10. A drier according to claim 8 and further comprising:
    a guide rail located below said drum and extending along said path of travel of said vehicle to limit the extent of rotation of said towel holders, said guide rail sloping downwardly in the direction of travel of said vehicle so that the rearmost towel hangs downwardly to an extent greater than towels forwardly thereof.

11. A drier according to claim 8 wherein said drum includes a pair of outer flange members, each towel holder comprising an axle pivotally mounted in said flange members and a flat plate secured to said axle, said lever means being a lever arm connected to said axle at a location outside said flange members.

12. A drier according to claim 11 wherein each flat plate is of length sufficient to bridge the circumferential distance between the axle of its towel holder and the axle of the adjacent towel holder, so that each axle acts as a stop to limit rotation of the adjacent towel holder in a direction opposite to said predetermined direction.

13. A drier according to claim 12 wherein said drying means includes a wringer roller, mounting means biasing said roller towards said drum, to squeeze said towels between said roller and said flat plates, a wiper, means pivotally mounting said wiper below said wringer to bias said wiper towards said drum, said wiper including a water directing surface, a trough located below said water directing surface and connected thereto to collect water from said water directing surface, and discharge means connected to said trough to remove water therefrom.

14. A towel drier for drying vehicles, comprising in combination:
   (a) a drum having a central axis, (b) a frame,
(c) means mounting said drum on said frame with said axis horizontal for rotation of said drum about said axis and with a space therebelow for a vehicle to be dried to pass below said drum, along a path of travel,
(d) drive means for rotating said drum in a predetermined angular direction,
(e) a plurality of towel holders spaced around the periphery of said drum and a towel connected to each towel holder,
(f) means pivotally mounting each towel holder for movement between a first position in which its towel is wrapped at least partly around said drum and a second vehicle drying position in which its towel hangs downwardly from said towel holder,
(g) drier means for drying said towels,
(h) and a guide rail located below said towel holders and extending along said path of travel of said vehicle to limit the extent of rotation of said towel holders and hence to control the distance by which said towels hang downwardly below said drum.

15. A drier according to claim 9 wherein said guide rail slopes downwardly in the direction of said path of travel of said vehicle, so that the rearmost towel hangs downwardly to a greater extent than the towels forwardly thereof.

* * * * *